United States Patent

Wortmann et al.

Patent Number: 5,261,480
Date of Patent: Nov. 16, 1993

[54] PROCESS AND APPARATUS FOR REPAIR OF DRIVE BLADES SUCH AS TURBINE BLADES

[75] Inventors: Jürgen Wortmann, Weichs, Fed. Rep. of Germany; Fritz Staub, Sevzach; Bruno Walser, Schottiken, both of Switzerland

[73] Assignee: Sulzer-MTU Casting Technology GmbH, Munich, Fed. Rep. of Germany

[21] Appl. No.: 1,583

[22] Filed: Jan. 6, 1993

Related U.S. Application Data

[62] Division of Ser. No. 806,877, Dec. 12, 1991, Pat. No. 5,193,272.

[30] Foreign Application Priority Data

Dec. 13, 1990 [DE] Fed. Rep. of Germany ....... 4039807

[51] Int. Cl.$^5$ ............... B22D 18/00; B22D 19/10
[52] U.S. Cl. ........................... 164/256; 164/258; 164/92.1
[58] Field of Search .............. 164/92.1, 256, 257, 164/258, 332

[56] References Cited

U.S. PATENT DOCUMENTS

| | | | |
|---|---|---|---|
| 3,857,436 | 12/1974 | Petrov | 164/60 |
| 4,333,630 | 7/1982 | Strange | 29/402.18 |
| 4,449,714 | 5/1984 | Mener | 29/402.07 |
| 4,589,175 | 5/1986 | Arrisoni | 29/402.18 |
| 4,940,566 | 7/1990 | Wood | 29/402.18 |
| 4,982,066 | 1/1991 | Warg | 29/402.07 |
| 5,048,183 | 9/1991 | Lang | 29/889.1 |
| 5,086,968 | 2/1992 | Fawley | 29/889.1 |
| 5,092,942 | 3/1992 | Fraser | 29/402.18 |
| 5,109,606 | 5/1992 | DeMichael | 29/889.1 |

FOREIGN PATENT DOCUMENTS

| | | | |
|---|---|---|---|
| 276404 | 11/1987 | European Pat. Off. | |
| 2307463 | 9/1974 | Fed. Rep. of Germany | |
| 2825283 | 12/1978 | Fed. Rep. of Germany | |
| 2071778 | 9/1981 | United Kingdom | |
| 2091140 | 7/1982 | United Kingdom | |
| 2205262 | 12/1988 | United Kingdom | 164/256 |
| 2206512 | 1/1989 | United Kingdom | 164/258 |

Primary Examiner—Kuang Y. Lin
Attorney, Agent, or Firm—Ladas & Parry

[57] ABSTRACT

A process and apparatus for the repair of single-crystal drive blades, such as turbine blades, in which a sound portion of the blade is inserted into an open bottom of a casting mold in communication with a casting cavity in the mold adopted to the shape of the blade. The molten metal is then cast into the mold to unite with the sound portion and an epitaxial single-crystal solidification of the melt is produced on the sound portion to form the entire blade. A part of the sound portion has an outer surface layer thereof removed to expose a core region which is constituted of substantially pure single crystal material prior to casting. The sound part is secured in a holder which is coupled to the casting mold for only a matter of seconds before the molten metal is cast into the mold.

8 Claims, 2 Drawing Sheets

PROCESS AND APPARATUS FOR REPAIR OF DRIVE BLADES SUCH AS TURBINE BLADES

This is a divisional of copending application(s) Ser. No. 07/806,277 filed on Dec. 12, 1991, now U.S. Pat. No. 5,193,272.

FIELD OF THE INVENTION

The invention relates to a process and apparatus for repairing blades of a drive mechanism, such as turbine blades.

BACKGROUND AND PRIOR ART

A process is disclosed in DE 28 25 283 for the deposition welding of metals for repair of typical gas turbine drive mechanism parts of alloys based on Fe, Co or Ni with the use of a compatible filler wire. Such repair processes have the disadvantage that they form a polycrystalline region in the single-crystal composition of the drive parts which reduces the strength properties thereof.

A process and apparatus are disclosed in U.S. Pat. No. 3,857,436 for production of single-crystal structural parts by means of a single-crystal seed crystal. The repair of a single-crystal blade by this process and apparatus is substantially identical to a new production of the blade, since the single-crystal solidification proceeds from a seed crystal of small cross section relative to the blade cross section and reaches the full blade extent only after a transition region. A disadvantage is that the residual seed crystal and the transition region must be separated after the production of the blade. Further, this process and apparatus have the disadvantage that the seed crystal surface is subjected to an aggressive atmosphere during the entire cleaning and warmup time of the casting mold, due to the vaporization of volatile compounds, which increases the risk of polycrystalline growth, slip formation, and a high concentration of crystal defects, at least in the initial phase of crystal growth. Over and above this, it must be considered that no defect-free seed crystals are available and seed crystals Which are rich in defects disadvantageously tend toward polycrystalline growth.

SUMMARY OF THE INVENTION

An object of the invention is to provide a process and apparatus for the repair of single-crystal drive blades by which the repaired blade consists throughout of a single-crystal material, to avoid a decrease in the strength properties, and so that a price-favorable repair of defective blade sections is made possible.

This object is satisfied by a process comprising the following steps:

a) preparation of a single-crystal from a defective single-crystal blade, by separating the defective blade region by cutting the blade approximately at right angles to the blade axis and by partially removing the surface of the remaining piece of blade down to a single-crystal core material, which has little or no residual stresses or defects;

b) heating a casting mold having an open bottom and a casting cavity for single-crystal reproduction of the separated blade region While heating a molten metal for casting the separated blade region, the heating of the casting mold and the molten metal being effected spatially separate from the remaining piece of blade; and c) bringing together the remaining piece of blade, the heated casting mold, and the molten metal, when the casting mold and the molten metal are at the casting temperature.

This process has the advantage that an undisrupted epitaxial growth of the melt on the core material of the remaining piece of the blade is assured because of the preparation of a defect-poor single-crystal piece of the blade, and thus this growth takes place on a strongly structured blade cross-sectional surface, since advantageously, the remaining piece of the blade is exposed in the heated casting mold only for a few seconds in the region of the separation before being covered by the melt.

A preferred embodiment of the process consists of holding the remaining piece of the blade in a heat conductive block that is adapted to its contour. For this purpose, a shaped recess is provided in the heat conductive block, preferably by electrochemical erosion. In this way, the remaining piece of the blade serves as a tool prior to removal of its polycrystalline surface which is rich in stress and defects The complicated blade contour is advantageously formed in the heat conductive block by means of electrochemical erosion. In order to separate the heat conductive block from the repaired blade, the heat conductive block has separating grooves parallel to the longitudinal axis of the remaining piece of the blade.

Subsequently, the remaining piece of the blade can be stripped in the region where the melt is to be supplied by removing the polycrystalline layers that are rich in defects and stresses until a defect-poor core material is exposed. The removal of the polycrystalline layers can be achieved by plasma etching, electrical erosion, or mechanical stripping. The production of crystal defects in regions close to the surface of the remaining piece of the blade during coating, during operation, or during the cutting of the blade to remove the defective region is reduced by etching the disrupted regions down to a defect density of at most three visually recognizable defects per $cm^2$ and a defect surface of 0.1 $mm^2$. Such a low defect density of the remaining core material does not prove adverse for a single-crystal growth.

Preferably, surface defect-rich regions and stressed layers in the region of the separation are eliminated from the remaining piece of the blade more just before introduction of the remaining piece of the blade into the heat conductive block; these regions have formed, for example, during storage or during stripping In another preferred embodiment of the process, prior to bringing together the remaining piece of the blade, the casting mold, and the molten metal, the casting mold is cleaned by heating it in a high temperature vacuum to the casting temperature, spatially separated from the remaining piece of the blade and from the molten metal. This extreme maintenance of purity of the single-crystal surface of the remaining piece of the blade in the region of separation has been successful up to now only with this process.

Apparatus for conducting the repair of a drive blade comprises three locally separated stations, of which a first station is equipped with a crucible, a heating device for melting the fusion material, and a device for casting the melted material; a second station is equipped with a releasable support for the casting mold and a heating and vacuum means for separate high-temperature vacuum purification and heating of the casting mold; and a third station is equipped with the heat conductive block and a coolable holder, and high-temperature-resistant coupling means for sealed joining of the casting mold and the heat conductive block.

The spatially separated stations have the advantage that the equipment therein can be temporarily engaged with one another and then spatially separated again so that a mutual contamination is prevented during the preparation of the casting mold by means of the heating and vacuum means as this has central significance for the success of the repair.

Also, since considerable evaporation of impurities can occur during the melting of the fusion material, for example, from heat shields, the crucible, or surface layers of the material, it is advantageous to spatially separate this equipment from that in the remaining stations during the melting phase, and thereafter operatively associate the equipment in the casting phase. The crucible is placed in the first station while the third station receives the endangered highly pure and defect-poor surface of the blade core material only after the equipment in the first and second stages are ready for the casting operation, i.e. are in a high temperature vacuum-purified and preheated state.

By means of the heat conductive block, which surrounds the remaining piece of the blade in spaced relation, the heat of crystallization is abstracted to the coolable holder of the heat conductive block during crystal growth. The cooling of the holder is only effected if temperature control requires it.

When the heat conductive block and the remaining piece of the blade are introduced into the third station, the core material of the remaining piece of the blade projects from the heat conductive block, preferably by a height that corresponds at least to the maximum wall thickness of the core material. This mode of introduction has the advantage that the core material of the remaining piece of the blade can be melted up to the level projecting from the heat conductive block during the casting of a superheated melt, before single-crystal epitaxial growth occurs. The reliability and reproducibility of the process is therefore increased.

Several constructions are suitable for temporary sealed coupling of the remaining piece of the blade and the hot casting mold.

In a preferred construction, an outer flange is provided at the bottom region of the casting mold, Which corresponds to a flange on the heat conductive block, so that advantageously a continuous, smooth engagement, Without steps, is obtained between the remaining piece of the blade and the region of the blade to be replaced by the cast metal since a precise placement of the open bottom of the casting mold on the remaining piece of the blade is assured because of the corresponding flanges In another preferred construction, the flanges of the casting mold and heat conductive block form a bayonet lock With inner conical tight surfaces, so that advantageously, after placement of the casting mold on the remaining piece of the blade, the inner conical tight surfaces assure a sealed placement and a form-fitting joint between the casting mold and the heat conductive block which is obtained at high temperatures by a quick rotational movement of the bayonet ring of the bayonet lock. The heat conductive block has at least two separating grooves in the longitudinal direction of the remaining piece of the blade, Which enable removal of the block after repair of the blade.

The corresponding flanges on the mold and the heat conductive block preferably have annular grooves Which fit inside each other, which assure an aligned placement of the casting mold on the holder and the heat conductive block.

Further, a rapid locking of the mold and the holder can be obtained according to a preferred embodiment by at least two outer clamps, which connect the mold and the holder in the hot state, both rapidly and in a form-fitting manner.

In the process of bringing together the heated casting mold, the heat conductive block and the crucible containing the molten metal, preferably the heated casting mold is transported to the third station and then the casting mold and holder are transported from the third station to the first station. In this preferred embodiment, the casting mold with the hot melt is not transported, Whereby the temperature of the melt can be maintained very precisely up until casting.

In another embodiment of the invention, the heated casting mold is moved from the second station to the third station and the crucible containing the melt is moved from the first station to the third station. This has the advantage that the heat conductive block containing the remaining piece of the blade and the holder are not transported, so that the temperature of the core material of the remaining piece of the blade remains precisely adjustable during the entire process.

If the invention provides for transport of the holder from the third station to the second station, and the first station is arranged above the second station and includes a tilting device for the crucible, then the three stations can be arranged one above the other in a container. In order to separate the stations into isolated spaces which can be evacuated and/or purged with gas, the container has sliders between the stations. A lifting device is disposed at the bottom of the container. After the various preparatory operations in the three isolated spaces in the three stations, the sliders are retracted and the lifting device brings together components to effect the casting in an advantageously very short time.

It is further contemplated that several single-crystal blades can be repaired at the same time by means of the process and apparatus of the invention. For this purpose, several individual heat conductive blocks are provided for respective blades, and these blocks are supported and cooled by a common holder and, if necessary, can be transported. In addition, in the second station there are several casting molds, which are joined, for example, by a common flange which is coupled to the holder of the heating conduction blocks, just prior to casting of the melt.

DETAILED DESCRIPTION OF A PREFERRED EMBODIMENT

Figure 1:
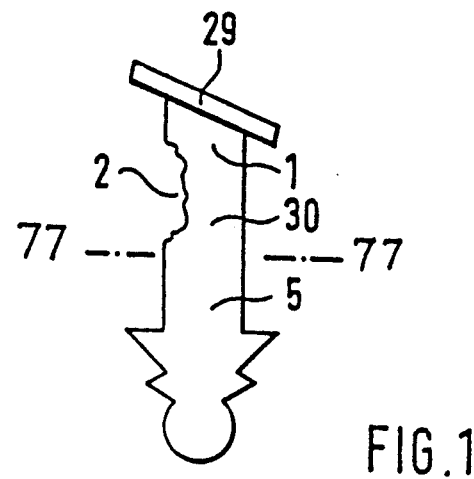
FIG. 1 is an elevational view which shows a turbine blade damaged at an edge of an insert portion of the blade.

FIG. 1 shows a portion of a single-crystal turbine blade damaged at an inlet edge 2. Such damage can also occurs in turbine blades in blade region 1 and on cover strip 29.

In a first Working stage of the repair process, blade region 1 including the damaged region at the inlet edge 2 is separated from the remainder of the blade. A separation cut is made approximately at right angles to the longitudinal axis of the blade along line 77—77, so that a further useable remaining, sound piece 5 of the blade is separated with an easily processable cross section of the blade lamella.

Figure 2:
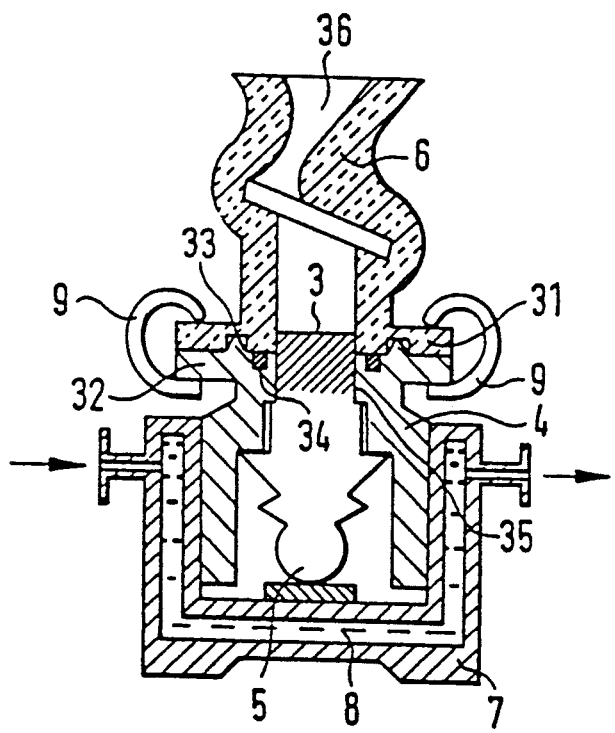
FIG. 2 is a vertical sectional view of a casting mold for receiving a remaining portion of the blade after separation of a region With the damaged edge.

This cross section may subsequently be used Without great material loss in order to form, in an electroerosive manner, a continuous recess in a heat conductive block 4, which corresponds to the shape of the remaining portion of the blade as shown in FIG. 2.

The single-crystal remaining portion 5 of the blade is rich in surface defects in the region of the separation cut, and is usually covered with a polycrystalline protective layer. A single crystal portion 3 is obtained from the core material of the blade so that it has substantially no surface defects. For this purpose, the surface material of portion 3 is removed down to the core to leave a defect-poor single-crystal core material in portion 3 of the remaining portion 5 of the blade With a defect density of at most three visually detectable defects per $cm^2$ and with a defect surface of up to 0.1 $mm^2$ in the region of the separation cut. In this region, the blade cross section is reduced by several m depending on the thickness of the polycrystalline protective layer and the penetration depth of the stress-rich and defect-rich layers. The region of reduction in blade thickness is shown in FIG. 2 by hatched lines.

FIG. 2 shows a casting mold 6 having an open bottom adapted to receive the portion 3 of the blade. The mold 6 is made of a heat-insulating material and has a casting cavity which is shaped to correspond to separated blade part 30 by means of a conventional wax melting process. The casting mold 6 is provided with a lower flange 31, which corresponds to a flange 32 of heat conductive block 4. The flanges 31 and 32 are connected by clamps 9. An annular groove 33 is provided in flange 31 in order to receive a boss of conical cross section to effect precise, aligned placement of the casting mold 6 on heat conductive block 4. An additional annular groove 34 in flange 32 of the heat conductive block 4 contains a sealing ring to seal the casting mold 6.

The portion 5 of the blade with core material 3 at its tip is fitted into a recess 35 of heat conductive block 5. Subsequently, the heat conductive block is inserted into a holder 7, Which has a cooling chamber 8. After preliminary heating of the casting mold 6 in a vacuum, the heated open bottom of casting mold 6 is placed on heat conductive block 4 and clamps 9 are engaged with flanges 31 and 32. The molten material is then immediately cast into a hopper region 36 and the melt flows onto the portion 5 of the blade.

Very important for the success of the process is the fact that the highly pure surface of core material 3 is not contaminated prior to casting of the melt. With the use of a superheated melt, core material 3 is melted down by an amount controlled by the cooling chamber 8 in holder 7 which abstracts heat via heat conductive block 4 so that a single-crystal epitaxial growth is developed in the cross section of the cast portion of the blade and a repaired single-crystal blade is formed with increasing crystallization speed.

Figure 3:
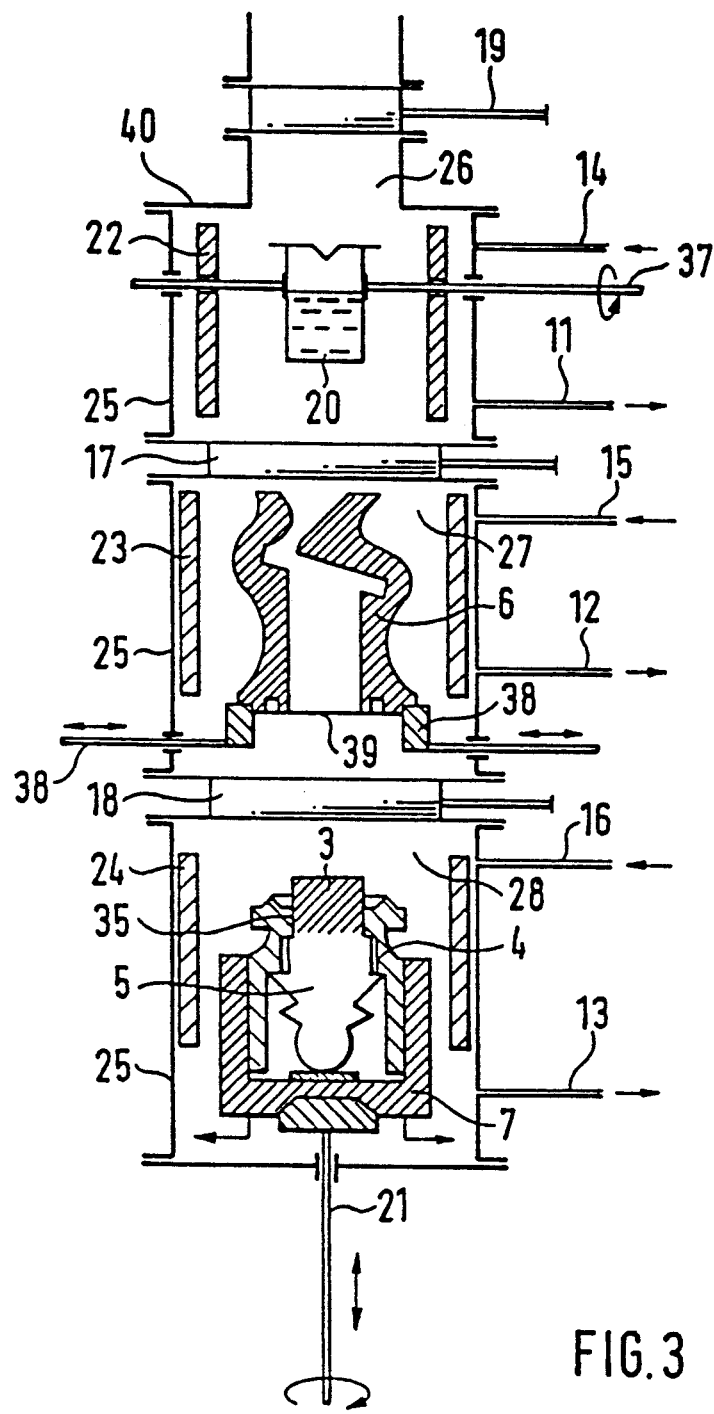
FIG. 3 is a vertical sectional view of apparatus for the repair of the turbine blade.

FIG. 3 shows the overall apparatus for repairing the turbine blade, and the apparatus comprises three locally separated stations 26, 27 and 28. The first station 26 is equipped with a crucible 20, a heating means 22 for melting the fusion material and a tilting device 37 for casting the melt. The second station 27 is equipped with a releasable support 38 for the casting mold 6. The mold 6 is provided at its bottom with an opening 39 corresponding to the cross section of the core portion 3 of the seed crystal. Additionally, a heating means 23 is provided in station 27 for separate high-temperature vacuum purification and heating of casting mold 6. A third station 28 has at least one heat conductive block 4 provided with recess 35 adapted to the cross section of portion 3 of blade 5 for supporting the Portion 3, and coolable holder 7. High-temperature-resistant coupling means are provided for sealingly joining the casting mold 6 and the heat conductive block 4.

The three stations 26, 27 and 28 are arranged one above the other in FIG. 3 in a container 25 and the stations are separated by two vacuum sliders 17 and 18. A third vacuum slider 19 is provided in cover 40 of container 25 for the introduction of the fusion material into crucible 20. The vacuum sliders 17 and 18 are closed during the melting of molten material in crucible 20, during the high-temperature vacuum purification and heating of casting mold 6 and during preheating of the portion 5 of the blade. In this way, the stations are isolated from one another. After termination of the preparation phases in the spatially separate stations 26, 27 and 28, sliders 17 and 18 are opened as soon as a pressure equilibration is produced by introducing inert gas via inlet lines 14, 15 and 16, or by adjusting the vacuum by means of vacuum lines 11, 12 and 13.

Subsequently, heat conductive block 4 is coupled in a matter of a few seconds with the casting mold by means of lifting device 21, and the block 4 and mold 6 are raised together to bring the casting cavity of the mold into the casting region of crucible 20. After casting of the molten metal into the mold, a single-crystal solidification of the melt is produced in place or at another station.

After complete solidification and the removal of casting mold 6 from the container 25, for example through an access door (not shown) therein, casting mold 6 is separated by known means from the now repaired single-crystal blade. The mold 6 can be reused by providing releasable separation means for casting mold 6.

Although the invention has been described with reference to a specific embodiment thereof, it will become apparent to those skilled in the art that numerous modifications and variations can be made within the scope and spirit of the invention if defined by the attached claims.

What is claimed is:

1. Apparatus for the repair of a single-crystal drive blade comprising:

holder means for holding a sound part of a drive blade from which a defective portion has been removed;

a casting mold coupled to said holder means with a portion of the drive blade inserted into a casting cavity of said mold, said portion of the drive blade having a surface layer thereof removed to expose a core region of substantially single-crystal composition, said casting cavity having a shape to form the defective portion of the drive blade when molten metal is cast into the casting cavity and integrated with said core region;

means for casting molten metal into said casting mold to integrate the cast metal with the sound part of the drive blade as a single-crystal repaired blade;

means providing first, second and third separate stations, each respectively including said means for casting molten metal, said casting mold and said holder means; and means for selectively isolating said separate stations from one another.

2. Apparatus as claimed in claim 1 wherein said holder means includes a heat conductive block in which said sound part of the drive blade is supported, said sound part including a portion projecting from said block and constituted by said core region from which said surface layer has been removed.

3. Apparatus as claimed in claim 2 wherein said blade has a wall thickness, said core portion projecting a distance from said holder means at least equal to the wall thickness of the blade thereat.

4. Apparatus as claimed in claim 2 comprising first and second flanges respectively on said heat conductive block and said casting mold, said first and second flanges being in confronting tight fitting relation when the casting mold is coupled to the holder means.

5. Apparatus as claimed in claim 4 comprising means on said first and second flanges for aligning said flanges when the casting mold is coupled to the holder means.

6. Apparatus as claimed in claim 4 comprising clamp means for releasably clamping said flanges together from outside the casting mold and the holder means.

7. Apparatus as claimed in claim 2 comprising means for providing relative movement between the elements in said stations to bring said casting mold and said holder means into operatively coupled relation in a position in which molten metal can be cast into the mold from said means for casting molten metal.

8. Apparatus as claimed in claim 2 wherein said stations are arranged in a container vertically one above another, said first station being at the top and containing the means for casting molten metal, the second station containing said casting mold and the third station containing said holder means, said apparatus further comprising lifting means for lifting the holder means to couple the same with the casting mold and then to lift the coupled holder means and casting mold into operative association with the means for casting molten metal.

* * * * *